Aug. 14, 1951 H. E. KOCH 2,564,577
CANOPY RELEASING MECHANISM
Filed Aug. 10, 1944 4 Sheets-Sheet 1

INVENTOR.
Harold E. Koch
BY
ATTORNEY.

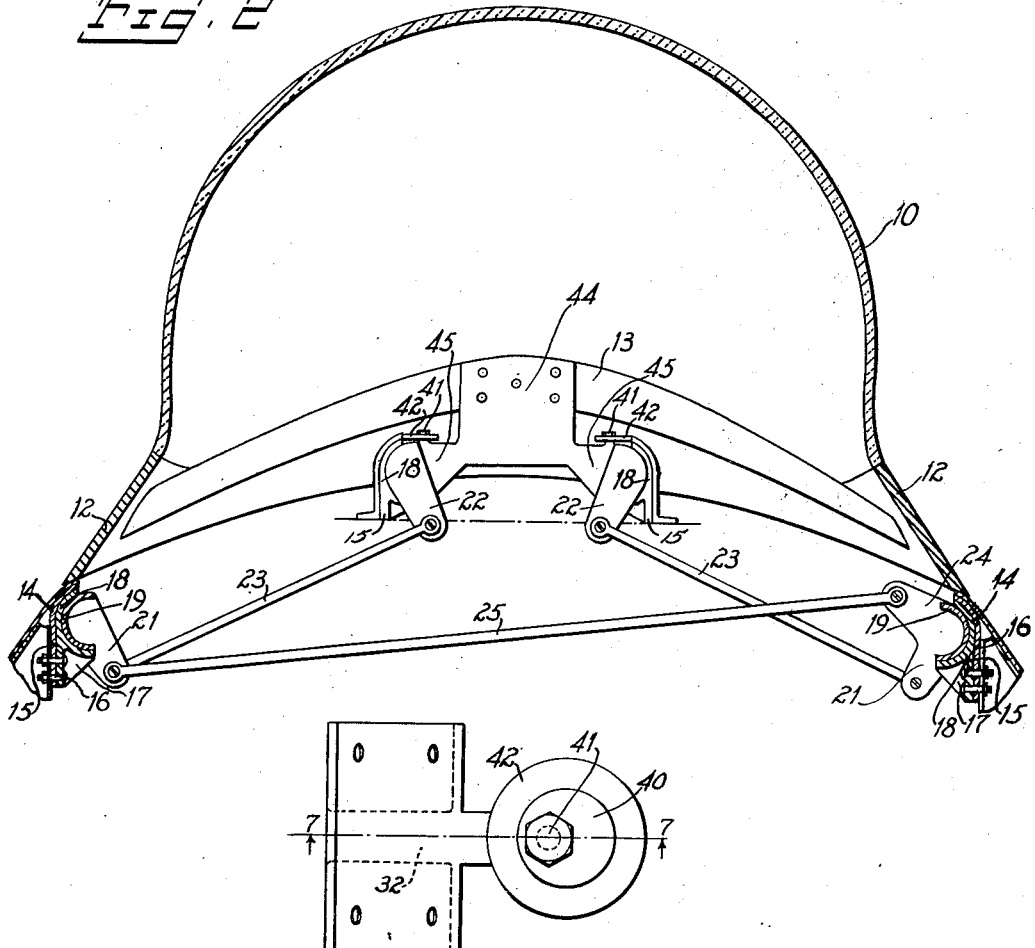

Aug. 14, 1951　　　　H. E. KOCH　　　　2,564,577
CANOPY RELEASING MECHANISM
Filed Aug. 10, 1944　　　　　　　　4 Sheets-Sheet 3
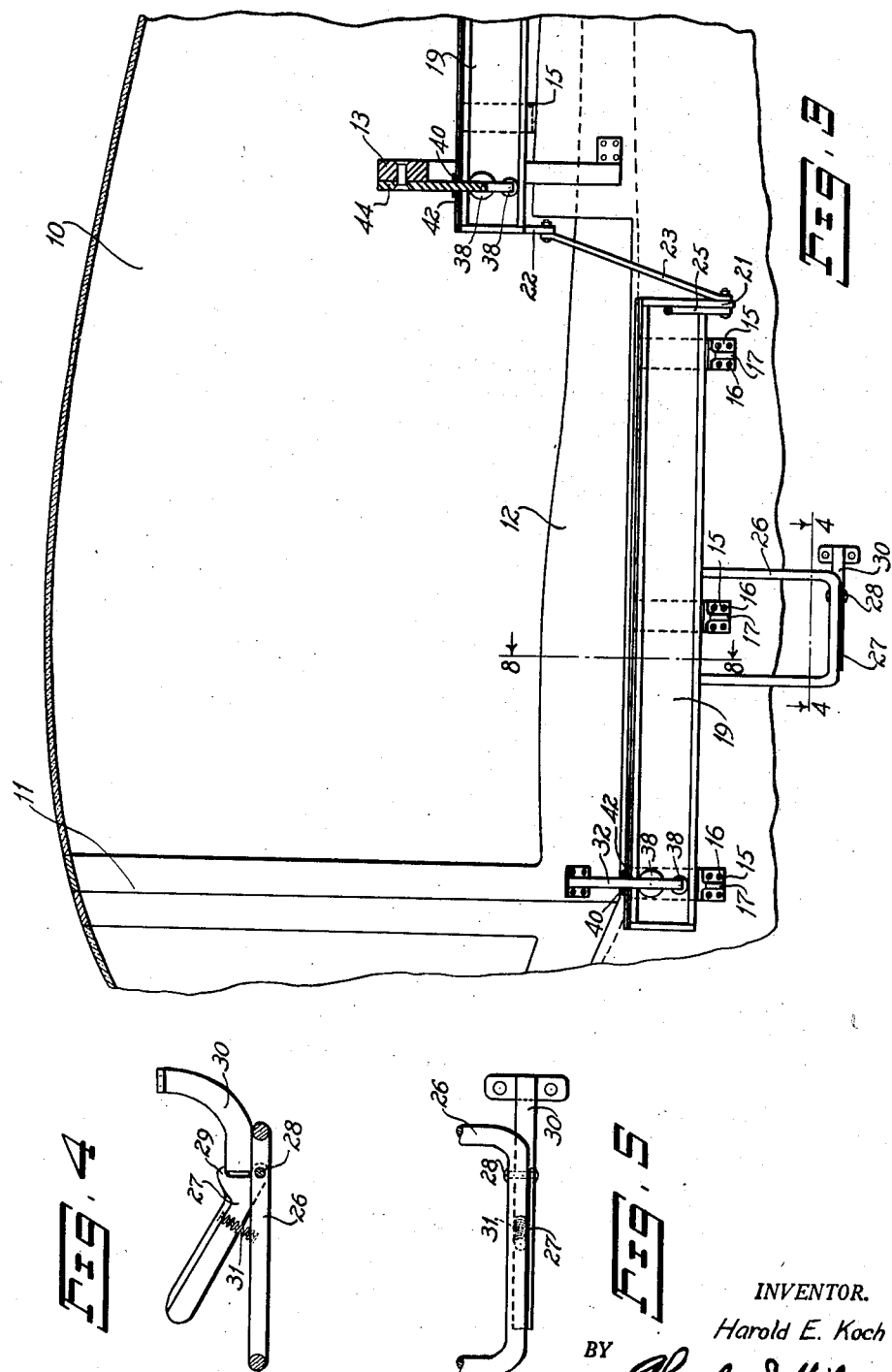
INVENTOR.
Harold E. Koch
BY
ATTORNEY.

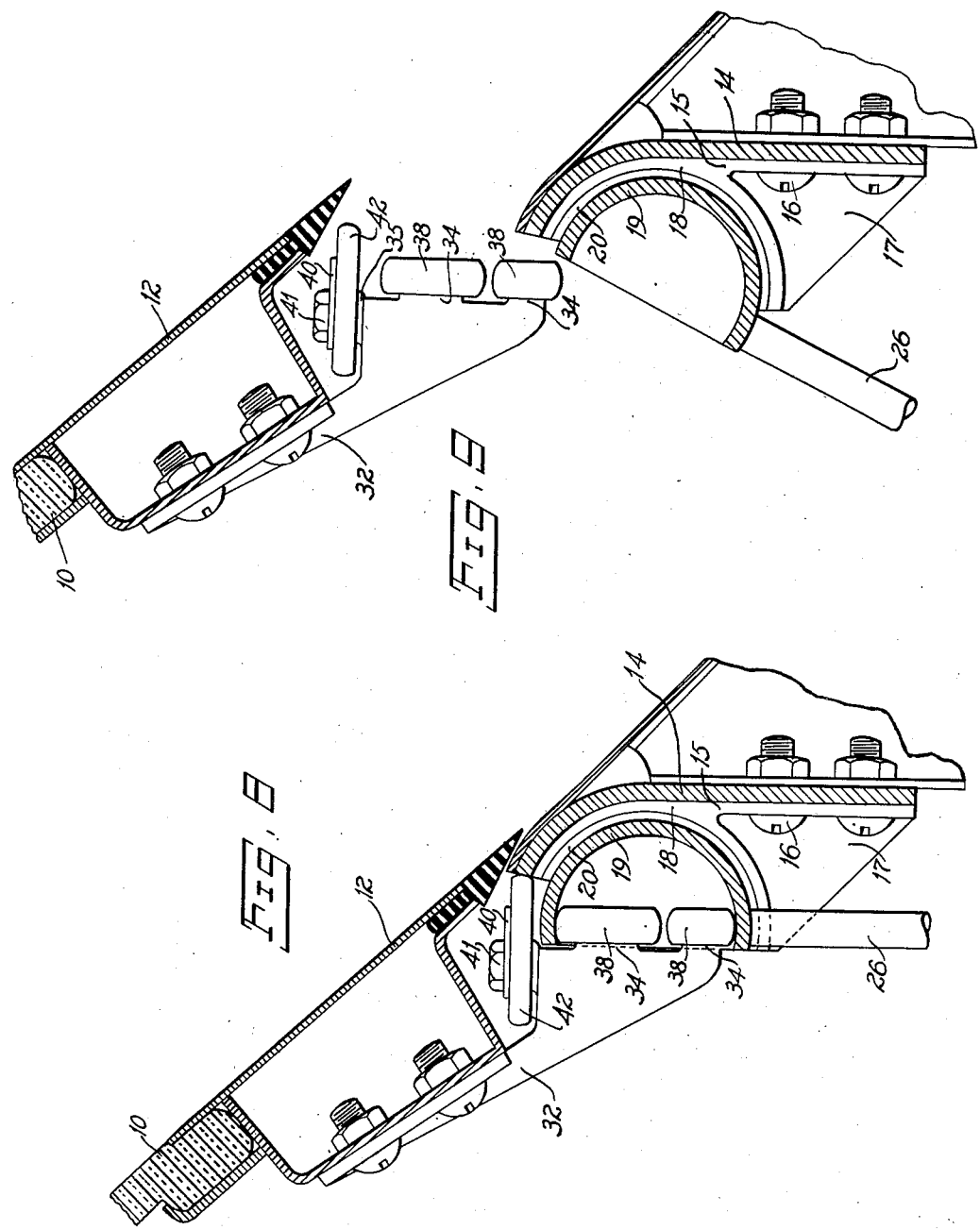

Patented Aug. 14, 1951

2,564,577

UNITED STATES PATENT OFFICE 2,564,577

CANOPY RELEASING MECHANISM

Harold E. Koch, Amityville, N. Y., assignor to Republic Aviation Corporation, Farmingdale, N. Y., a corporation of Delaware Application August 10, 1944, Serial No. 548,913

26 Claims. (Cl. 244—121)

This invention relates to aircraft canopies and particularly to the mechanism by which the canopy is mounted for reciprocation on the fuselage.

The present invention proposes a mechanism for mounting the canopy on the fuselage of an aircraft whereby it may normally reciprocate upon the fuselage to and from its closed position freely and easily and at the same time may be instantly freed and released at all points from operative connection with the fuselage to be jettisoned in the event of an emergency. To this end a single, unitary jettisoning control is provided occupying a fixed, predetermined position within the cockpit, the manipulation of which controls the releasing mechanism to free the canopy of all connection with the fuselage.

Among its other objects the instant invention contemplates a sturdy mechanism not readily subject to damage or jamming, simple in its operation and construction, easy of installation, and instantly and completely operable for the full freeing of the canopy.

With the above and other objects in view, as will be apparent, this invention consists in the construction, combination and arrangement of parts all as hereinafter more fully described, claimed and illustrated in the accompanying drawings, wherein:

Fig. 2 is a transverse section taken along the line 2—2 of Fig. 1 and illustrates the means by which all of several components of the attachment between the canopy and the fuselage may be operated in unison for the release of the canopy:

Fig. 3 is a fragmentary longitudinal section taken generally along the line 3—3 of Fig. 1 showing, in elevation, the rails by which one side of the canopy is mounted for reciprocation on the corresponding side of the fuselage:

Fig. 4 is a horizontal section along line 4—4 of Fig. 3 through the single emergency control handle:

Fig. 5 is a fragmentary elevation of the single emergency control handle taken at right angles to Fig. 4:

Fig. 6 is an enlarged plan view of one of the roller brackets mounted on the canopy:

Fig. 7 is a vertical section taken along line 7—7 of Fig. 6 to illustrate the mounting of the several rollers and their relative positions:

Figure 1:
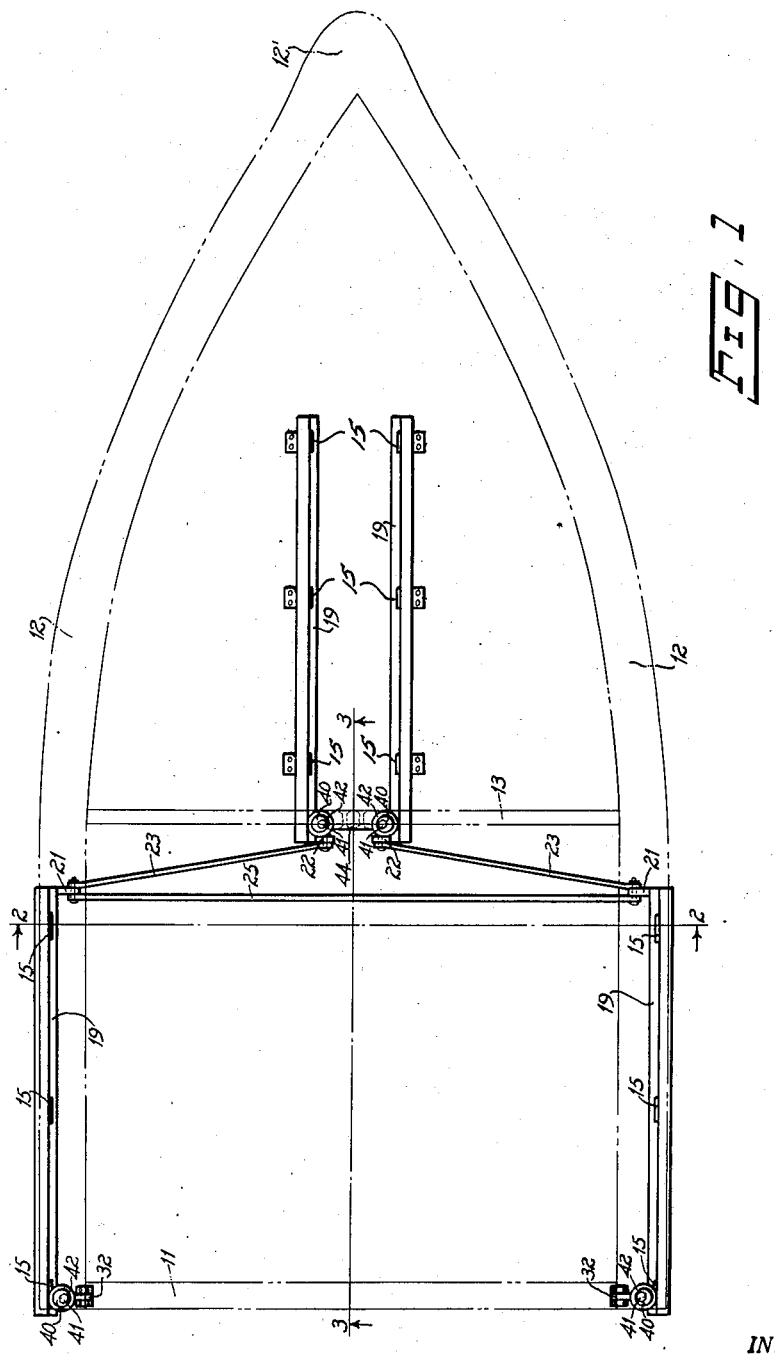
Fig. 1 is a top plan view of the present mechanism for the mounting and emergency release of an aircraft canopy, the canopy structure per se being illustrated in phantom lines.

Fig. 8 is a vertical section taken along line 8—8 of Fig. 3 illustrating the cooperation between one of the roller brackets of the canopy and the rail carried by the longéron whereby the canopy is locked for reciprocation on the longéron: and Fig. 9 is an identical section illustrating the canopy released from sliding coaction with the rail of the longéron and the roller bracket thereof out of cooperative association with the normally coacting rail.

The present invention may function in conjunction with any type of reciprocating or sliding aircraft canopy, but for the purpose of illustration it is shown and described specifically in connection with a "bubble" type canopy such as shown in Fig. 1. This type of canopy is relatively wide at its forward end and tapers toward its aft end, thereby resulting in a somewhat restricted aft portion. The specific type of canopy forms no part of the present invention, but for present purposes may be described as having a clear transparent body 10, secured to a frame 11 at its forward end and having a metallic apron or frame 12 along the edges of its longitudinal sides, the sides of the frame 12 merging and uniting at the aft end 12' of the canopy. At the point where the canopy 10 begins to taper, or in other words where the large forward portion thereof approximately ends, a yoke 13 is positioned between the sides of the metallic frame or apron 12 and at its extremities is fixed to the sides of the frame or apron. This yoke provides means whereby the aft end of the canopy may be mounted for reciprocation and in the structure here disclosed curves upwardly to clear that portion of the fuselage aft of the cockpit. The structure just described forms no part of the present invention and is merely illustrative of one type of canopy with which the present invention may be adapted to cooperate.

The longéron 14 on each side of the cockpit is provided at spaced intervals with a bearing bracket 15, permanently and rigidly secured to the longéron in any suitable manner, as for example the bolts 16. Each of these bearing brackets 15 is provided with an outstanding web 17 which extends to and assists in supporting the arcuate seat 18 at the upper end of the bearing bracket. As illustrated in Figs. 1 and 3 three of these bearing brackets 15 are provided on each side of the fuselage for cooperation with the forward portion of the canopy. For cooperation with the tapered rear portion of the canopy a series of similar bearing brackets 15 are mounted on the fuselage to the rear of the cockpit and upon each side of the longitudinal axis of the canopy. The arcuate seats 18 of the brackets 15 secured to the longérons 14 face or open inwardly so that the seats on the one side of the cockpit face and open toward seats on the opposite side of the cockpit. Because of the general aftward taper of the canopy the two rows or series of brackets 15 mounted on fuselage aft of the cockpit and designed to coöperate with rollers carried by the yoke 13 of the canopy, as will be described, are much closer together but, like the forward rows of brackets 15 are so positioned that the seats 18 of each row face and open toward the seats 18 of the opposite row.

Thus a full complement of these bearing brackets 15 may consist of three brackets fixed to each of the longérons 14 of the fuselage and a series of three fixed to the fuselage upon each side of the central longitudinal axis of the canopy and fuselage. When so situated and mounted the individual arcuate seats of each series of brackets are in substantially accurate alignment one with the other.

Mounted for oscillation in the aligned seats 18 of each series of brackets 15 is a hollow arcuate rail 19, the transverse curvature of which is substantially concentric to that of the coacting seats 18. If found to be desirable a fixed self-lubricating bearing member 20 may be interposed between each seat 18 and the coacting face of the rail 19 as shown in Figs. 8 and 9. These rails 19 are somewhat greater than semi-circular in cross-section, and as will be seen from Figs. 1 and 2 are arranged in pairs, one pair coacting with the brackets 15 at the forward end of the canopy and the other pair coacting with the brackets 15 at the aft end portion of the canopy. This arrangement of two pairs of rails 19 and coacting supporting brackets 15 is occasioned by the form and shape of the canopy and therefore it is to be understood that any number and arrangement of rails 19 and brackets 15 as, for example, a single rail 19 and supporting brackets on each side of the fuselage, may be employed without departure from this invention.

Each of these rails 19 is mounted for oscillation in its particular set of seats 18 and this oscillation is from the closed position shown in Fig. 8 to the open position shown in Fig. 9 and vice versa. Other than their oscillatory movement in the seats 18 of their respective sets of brackets 15, these rails 19 have no movement but remain fixed, especially with respect to movement longitudinally of the fuselage. As will hereinafter be more fully described, when the rails 19 are in the position shown in Fig. 8 the canopy 10 and its associated parts is free to reciprocate or slide longitudinally of the fuselage; while, when the rails 19 are positioned as shown in Fig. 9, the canopy is freely and easily separable from the fuselage and therefore may be readily jettisoned.

To provide for the simultaneous oscillatory movement of all of such rails 19 as may be employed in the mounting of the canopy, the rear or the aft ends of the forward rails 19 are provided with angularly projecting ears or lugs 21 which project downwardly from the ends of the rails 19. The forward ends of the aft rails 19 are provided with similar ears or lugs 22 and these ears or lugs 21 and 22 on each side of the fuselage are connected by the rods 23 pivotally secured, by any suitable means, at their respective ends to the ears with which they coact. One of the ears 21 of the forward rails 19 is provided with an upward extension or arm 24 which is connected by a link or rod 25 to the opposed ear 21 of the opposite forward rail 19, the ends of this link or rod being suitably pivoted to the arm 24 and the ear 21. By the provision of the extension or arm 24 that rail 19 has, to all intents and purposes, a bell crank at its rear end by which the movement of one forward rail 19 is transmitted to its companion rail by the link or rod 24. Should only a single rail 19 be provided on each side of the fuselage the rod 25 and its connections to both of said rails will cause them both to move similarly in unison if one is moved, and where two sets of rails 19 are employed, as illustrated, the movement of one forward rail 19 will cause all of the rails to oscillate in the same direction and in unison.

One of the rails 19, here shown as the rail having the single ear or lug 21 secured thereto, is provided with a handle 26. When this handle is grasped and pulled inwardly toward the longitudinal axis of the fuselage, the rail 19 to which it is attached moves from the position shown in Fig. 8 to that shown in Fig. 9, and by reason of the pivotal connections of the rods aforesaid, all of the rails 19 comprising the assembly similarly move in unison.

It is desirable that the handle 26 be locked in the position shown in Fig. 8 so that the rails 19 under normal conditions will remain fixed and incapable of oscillatory movement. For that purpose a latch 27 is hinged or pivoted to the handle, as at 28, and is provided with a pawl 29 which engages over a fixed stud 30 attached to the inner face of the side of the fuselage. In order to insure the normal locking coöperation between the pawl 29 of the latch 27 and the stud 30, a spring 31 is interposed between the latch and the handle 26 whereby the latch normally assumes a position at an angle to the handle 26 with the pawl 29 engaged over the stud 30. To move the rails 19 in unison for the purpose of releasing the canopy, it is necessary to grasp the handle 26 and at the same time move the latch 27 against the pressure of the spring 31 thereby disengaging the pawl 29 from the stud 30, whereupon the handle 26 may be moved from the position shown in Fig. 8 to the position shown in Fig. 9. This moves all of the rails 19 in unison from the position shown in Fig. 8 to the position shown in Fig. 9. Reversely when the handle 26 is moved downwardly toward the side of the fuselage until the pawl 29 engages the stud 30, the rails will be moved in unison from the position shown in Fig. 9 to the position shown in Fig. 8.

For coöperation with the forward rails 19 the canopy, adjacent its forward end and upon each of its sides, is provided with a roller bracket comprising a plate 32 fixed flush against and to the inner face of the forward end of the longitudinal frame 12 of the canopy. This plate 32 terminates at its lower end below the longitudinal frame 12 and is there provided with a lateral extension 33 carrying a series of rollers. The outer edge face of the extension 33 is provided with a pair of superposed, spaced bosses 34, while the upper horizontal edge face thereof is provided with a boss 35 adjacent the outer or vertical edge face thereof. The bosses 34 coact with rollers of different diameters, the roller coacting with the upper boss usually having a greater diameter than that coacting with the lower boss 34. Any type of rollers may be used but for purposes of illustration the following roller structure may be employed, to wit: a roller bearing 36 is fixed to each boss 34 by screws or other suitable fastening means 37, a roller 38 is mounted upon this bearing 36, and a series of ball bearings 39 is equally seated in both the roller and the bearing. It will be observed that the screw or other fastening means 37 is countersunk in exposed faces of the bearings 36 so that there is no projection of any kind beyond the faces of the rollers 38. The rollers 38 are free to rotate on the bearings 36 but the latter are fixed against rotation by the screws, or other fastening means 37 in clamping engagement with the bosses 34 and the bearings.

The upper boss 35 has a bearing 40 fixed eccentrically thereto by means of the bolt 41 passing through the bearing and threaded into the boss. When tightened this bolt 41 locks or clamps the bearing 40 fixedly to the boss 35. Upon the bolt 41 being loosened the bearing 40 may be eccentrically adjusted thereon which adjusts the position of the horizontal roller 42 mounted for rotation on this bearing 40. A series of ball bearings 43 is equally seated in both the bearing 40 and the roller 42 and is interposed between these elements.

Thus each roller bearing comprises a plate 32 fixed to a side frame 12 of the canopy and extending to a position adjacent the open face of one of the rails 19 where it is provided with an adjustable horizontal roller 42 to extend above or over the upper side of the coacting rail 19 and is also provided with a pair of superposed rollers 38 of different diameters for engagement within and against the opposed sides of the rail 19. The upper roller contacts directly with the fuselage structure, viz: the upper edge of the longéron, thereby transmitting all lateral load from the canopy directly to the fuselage structure and not to the rails 19 through the rollers 38. By having two superposed rollers 38 independently operating against the inner surface of the arcuate rail 19, free rolling and sliding movement of the canopy is always possible and binding between the rails 19 and the rollers 38 is eliminated. These rollers 38 may, of course, be of the same diameter or the roller with the smaller diameter may be positioned above that having the larger diameter, or they may be as illustrated, and even one roller may be employed in lieu of the two illustrated. However, the use of two rollers as shown and described eliminates the necessity of having a play between the rollers and the rail, provides a more even distribution of the loads and insures the free rolling or sliding movement of the canopy.

When the rails 19 are positioned as shown in Fig. 8, i. e. when the handle 26 is held as illustrated in Fig. 3, the upper side of each rail 19 extends over the upper roller 38 while the lower roller 38 operates against the inner face of the lower edge of the rail. When the handle 26 is released and moved to the position shown in Fig. 9, each rail 19 oscillates within its seats 18 moving the upper side thereof from its position over the upper roller 38, thus releasing or permitting the release of the rollers by the rail thereby freeing the canopy from engagement with and by the rails 19.

The yoke 13 is provided with a fixed central plate 44 upon each side of which is provided an extension 45 identical in all respects to the extension 32 of the bracket extension 33 and carrying the same number and type of rollers 38—42 to coact with the rails 19 carried by the seats 18 of the brackets 15 aft of the cockpit. The cooperation between the rollers 38—42 carried by the extensions 45 of the plate 44 attached to the yoke 13 and the rails 19 aft of the cockpit, reciprocatingly supports the aft end of the canopy while the cooperation of the rollers 38—42 on each side of the forward end of the canopy similarly supports that end of the canopy. Thus the canopy is supported at three points and, as above described can be released at all three points at one and the same time if desired.

From the foregoing it is manifest that both the forward and aft ends of the canopy 10 are mounted for free sliding movement in a series of rails mounted upon the fuselage which, while being capable of simultaneous oscillation, are immovable longitudinally. These rails are interconnected for oscillation in unison and for all practical purposes, constitute oscillatory parts of the fuselage.

As above pointed out it is manifest that single rails may be employed for the support of each side of the canopy and that other changes in the construction and arrangement of parts may be made without departing from the spirit and scope hereof.

What is claimed is:

1. The combination with the fuselage of an aircraft, of a slidable canopy coactig therewith, a series of hollow, open rails mounted on said fuselage for rotation between two positions, and rollers secured to said canopy to be seated within and engaged by said rails in one of their positions and be released by said rails in the other of their positions.

2. The combination with the fuselage of an aircraft and a slidable canopy coacting therewith, of a rail arcuate in cross section mounted upon each side of the fuselage, rollers carried by the canopy for reception within said rails, and means whereby said rails may be rotated bodily to either circumscribe or release said rollers.

3. The combination with an aircraft fuselage and canopy coacting therewith, of a rail concaved in cross section on each side of the fuselage, rollers fixed to said canopy for reception within said rails, and means for moving said rails to and from a position restraining said rollers.

4. The combination with an aircraft fuselage and sliding a canopy coacting therewith, of a rail concaved in cross section on each side of the fuselage, rollers fixed to said canopy for reception within the concavity of each rail, and means for oscillating said rails to and from a position circumscribing said rollers.

5. The combination with the fuselage of an aircraft and a slidable canopy coacting therewith, of a concaved rail mounted for oscillation on each side of said fuselage, rollers mounted on each side of the canopy for reception within the concavities of said rails, and means whereby said rails may be oscillated in unison to and from positions confining and restraining said rollers.

6. The combination with the fuselage of an aircraft and a slidable canopy coacting therewith, of a hollow rail mounted for rotary movement on each side of the fuselage, each of said rails being somewhat greater than semi-circular in cross section and positioned so that the open sides thereof face each other transversely of the fuselage, and rollers carried by each side of the canopy for reception within said rails, each of said rails circumscribing the coacting rollers in one of its rotary positions and releasing said rollers in another of its rotary positions.

7. The combination with the fuselage of an aircraft and a slidable canopy coacting therewith, of a rail mounted for rotary movement on each side of the fuselage, each rail comprising a hollow cylindrical segment positioned to open inwardly of the fuselage, rollers carried by each side of the canopy to be received within the adjacent rail, and means whereby said rails may be rotated in unison to and from position circumscribing said rollers.

8. The combination with the fuselage of an aircraft and a canopy slidably mounted for cooperation therewith, of a pair of opposed rails carried by the fuselage, each rail defining a partial surface of revolution, rollers carried upon each side of said canopy for reception and operation within said rails, and means for mounting said rails for oscillation in unison to and from positions restraining said rollers against movement normal to the longitudinal axes of said rails.

9. The combination with the fuselage of an aircraft and a slidable canopy cooperating therewith, of a hollow rail, arcuate in cross section mounted upon each side of the fuselage, vertical rollers carried upon each side of said canopy to operate within and bear against substantially opposed edge portions of said rail, and horizontal rollers associated with said vertical rollers to operate against the fuselage adjacent to said rails.

10. The combination with the fuselage of an aircraft and a slidable canopy cooperating therewith, of a hollow rail mounted upon each side of the fuselage, vertical rollers carried upon each side of said canopy to operate within and bear against opposed sides of said rail, horizontal rollers associated with said vertical rollers and operable against the fuselage adjacent to said rails, and means for individually adjusting each horizontal roller to insure its rolling engagement with the fuselage.

11. The combination with the fuselage of an aircraft and a slidable canopy cooperating therewith, of a hollow rail mounted upon each side of the fuselage, vertical rollers carried upon each side of said canopy to operate within and bear against opposed sides of said rail, horizontal rollers associated with said vertical rollers and operable against the fuselage adjacent to said rails, and means for oscillating said rails in unison to engage and disengage said vertical rollers.

12. The combination with the fuselage of an aircraft and a canopy slidably mounted thereon, of a bracket plate secured to the forward end of each side of the canopy provided at its lower extremity with a lateral extension, a horizontal roller mounted on said extension, a pair of superposed vertical rollers mounted on said extension below and in a plane at right angles to said horizontal roller, and an open track, curved in cross-section, mounted for oscillation upon each side of the fuselage for the reception of the vertical rollers of the corresponding bracket plate whereby the oscillation of the track in one direction positions it with its opposed sides in cooperation with said vertical rollers and the oscillation thereof in the reverse direction positions it with only one of its sides in cooperation with one of said vertical rollers, the horizontal roller projecting beyond the plane of the vertical rollers to bear against the fuselage.

13. The combination with the fuselage of an aircraft and a canopy slidably associated therewith, of bracket plates fixed to said canopy, a plurality of independent rollers carried by each plate, a hollow, open rail carried by the fuselage individual to and for the reception of the rollers of each bracket, mounting means for each rail permitting oscillation thereof to and from a position where said rollers are confined within said rails, arms fixed to the extremities of said rails, and rods interposed between and pivotally connected to said arms.

14. The combination with the fuselage of an aircraft and a canopy slidably mounted thereon, of a roller carried by said canopy, a rail carried by the fuselage and curved laterally throughout its length for cooperation with said roller, and mounting means for the rail permitting the bodily rotation thereof to and from a position confining said roller.

15. The combination with the fuselage of an aircraft and a canopy, having its sides converging aftward, slidably mounted thereon, of a pair of opposed forward rails carried by the fuselage, a second pair of adjacent rails aft and inboard of said forward rails, rollers spaced transversely of and adjacent the aft end of the canopy for cooperation with the second rails aforesaid, rollers carried by the forward end of said canopy for cooperation with the forward rails, means for mounting each of said rails for rotary oscillation to and from cooperative engagement with their respective rollers, and means whereby the oscillation of any one of said rails similarly and simultaneously oscillates the remainder of said rails.

16. The combination with the fuselage of an aircraft and a canopy slidably mounted thereon, of a bearing bracket fixed to each side of the fuselage including a curved seat facing inwardly of the fuselage, a track curved in cross-section mounted for oscillation in the seat of each bearing bracket, means whereby said tracks oscillate in unison between open and closed positions, and rollers carried by the canopy for reception within each track to operate against opposed sides of the track when in closed position and against one side of the track when in open position.

17. The combination with the fuselage of an aircraft and a canopy slidably mounted thereon, of a bearing bracket fixed to each side of the fuselage including a curved seat facing inwardly of the fuselage, a track curved in cross-section concentric with said seat and mounted for oscillation in the seat of each bearing bracket, means whereby said tracks oscillate in unison between open and closed positions, vertical rollers carried by the canopy for reception within each track to operate against opposed sides of the track when in closed position and against one side of the track when in open position and, a horizontal roller disposed above said vertical rollers to operate over said track and against the fuselage structure.

18. The combination with the fuselage of an aircraft having a cockpit and a canopy mounted for reciprocation thereover, of a series of brackets upon each side of the cockpit each including an arcuate seat, the seats upon each side of the cockpit being aligned one with the other longitudinally of the fuselage, a forward rail, arcuate in cross section, mounted for rotary movement in each set of aligned seats, a plurality of adjacent rows of brackets situated centrally of the fuselage aft of the cockpit, each bracket of each row including an arcuate seat aligned longitudinally of the fuselage with the other seats of that row, an aft rail, arcuate in cross section, mounted for rotary movement in the aligned seats of each aft row of brackets, a downwardly extending lateral lug fixed to the inner extremity of each aft rail, a similar lug fixed to the aft extremity of each of the forward rails, an upwardly extending arm fixed to the aft end of one of the forward rails, a rod connecting each of the lugs at the inner ends of the aft rails to the downwardly extending lug of the corresponding forward rail, a rod connecting said upwardly extending arm of one forward rail to the downwardly extending lug of the companion forward rail, means for rotating one of said rails whereby all of the rails will be simultaneously and equally rotated in their respective seats through the aforesaid rods, rollers on opposite sides of the forward end of the canopy to operate within the forward rails, a transverse yoke adjoining the aft end of the canopy, a downwardly extending plate fixed to said yoke and extending between said aft rails, and rollers carried by said plate to operate within each of said aft rails.

19. The combination with the fuselage of an aircraft having a cockpit and a canopy movable longitudinally of the fuselage over the cockpit, of a hollow forward rail upon each side of the cockpit, a pair of parallel hollow rails positioned centrally on the fuselage aft of the cockpit, each of the rails aforesaid having a coextensive opening therein, means individual to each of said rails for mounting it for bodily rotary movement, independent attaching means carried by the canopy to project through the opening of and operate within each rail, and means whereby all of said rails may be rotated in unison for the simultaneous release or engagement of all of said attaching means.

20. The combination with the fuselage of an aircraft having a cockpit and a canopy movable longitudinally of the fuselage over the cockpit, of a hollow forward rail upon each side of the cockpit, a pair of parallel hollow rails positioned centrally on the fuselage aft of the cockpit, each of the rails aforesaid having a coextensive opening therein, means individual to each of said rails for mounting it for bodily rotary movement, an attaching means on each side of the forward end of the canopy to project through the opening of and operate within the corresponding forward rail, attaching means carried within and adjacent the aft end of the canopy to be positioned between the aft rails and project through the opening of and operate within each of the aft rails, and means whereby the rotary movement of one of the forward rails causes all of the rails aforesaid to rotate in unison for the simultaneous release or engagement of the several attaching means.

21. The combination with a reciprocable body, of a hollow rail, generally circular in cross section and comprising a segment greater than a semi-circle, means for mounting said rail for rotary movement to and from a position where the chord of said segment rests substantially vertical, and attaching means carried by the body to be inserted within the rail when the chord of the segment rests at an angle to the vertical and to be engaged and circumscribed by the rail when the chord of the segment rests vertically.

22. The combination with a reciprocable body, of a hollow rail generally circular in cross section and comprising a segment at least equal to a semi-circle, means for mounting said rail for rotary bodily movement, and attaching means carried by the body to be seated and reciprocate within said rail when circumscribed thereby.

23. The combination with an aircraft fuselage and a sliding canopy associated therewith, of a rail disposed upon each side of the fuselage comprising a partial circle in cross section, a roller occupying a fixed vertical position on each side of the canopy to be received within the adjacent rail, and means for mounting each rail for rotary movement to and from a position where the chord of the rail rests substantially parallel to the plane of said roller to confine the latter or at an acute angle thereto to release the roller.

24. The combination with aircraft fuselage and canopy slidably associated therewith, of a pair of superposed rollers mounted in a fixed position on each side of said canopy, a hollow rail disposed upon each side of the fuselage to receive said rollers comprising, in cross section, a partial circle at least equal to a semi-circle, and means for mounting each rail for rotary movement to and from position where the rail confines said rollers and its chord rests substantially parallel to the plane of the rollers.

25. The combination with an aircraft fuselage and a canopy slidably associated therewith, of superposed rollers disposed in a vertical plane upon each side of the canopy, of an open rail generally circular in section positioned upon each side of the fuselage for the reception of and reciprocating cooperation with the adjacent rollers, and means for mounting each rail for bodily rotary movement whereby it may be moved to a position confining and contacting both of its coacting rollers or, in the alternative, to a position contacting only one of its coacting rollers.

26. The means for mounting a reciprocable body upon a fixed structure comprising rollers mounted on the reciprocable body, a tubular rail having a longitudinal opening in the wall thereof coextensive with the rail, and brackets mounted on the fixed structure to support said rail for oscillation about its longitudinal axis to either of two positions whereby the rollers may be inserted in or removed from the rail through said opening in one of its positions and be restrained by the rail in the other of its positions.

HAROLD E. KOCH.

REFERENCES CITED

The following references are of record in the file of this patent:

UNITED STATES PATENTS

| Number | Name | Date |
|---|---|---|
| 1,064,875 | Trabue | June 17, 1913 |
| 1,682,229 | Joyce | Aug. 28, 1928 |
| 2,125,752 | Saulnier | Aug. 2, 1938 |
| 2,295,345 | Jerman | Sept. 8, 1942 |
| 2,361,113 | Lobelle | Oct. 24, 1944 |

FOREIGN PATENTS

| Number | Country | Date |
|---|---|---|
| 339,473 | Great Britain | Dec. 11, 1930 |
| 671,540 | Germany | Feb. 9, 1939 |